(12) United States Patent  (10) Patent No.: US 9,202,234 B2
Bourret et al.  (45) Date of Patent: Dec. 1, 2015

(54) GLOBALLY ASSEMBLED, LOCALLY INTERPRETED CONDITIONAL DIGITAL SIGNAGE PLAYLISTS

(75) Inventors: Mary Louise Bourret, Portland, OR (US); Basil Isaiah Jesudason, Portland, OR (US); Andrew Rodney Ferlitsch, Camas, WA (US); Sara Lynn Leslie, Washougal, WA (US); Ronnie Neil Patton, Lake Oswego, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1027 days.

(21) Appl. No.: 13/314,402

(22) Filed: Dec. 8, 2011

(65) Prior Publication Data

US 2013/0151656 A1   Jun. 13, 2013

(51) Int. Cl.
   G06F 15/16 (2006.01)
   G06Q 30/02 (2012.01)
(52) U.S. Cl.
   CPC .................................. *G06Q 30/0252* (2013.01)
(58) Field of Classification Search
   CPC .................................................... G06Q 30/252
   USPC ......................................................... 709/217
   See application file for complete search history.

(56) References Cited

U.S. PATENT DOCUMENTS

| | | | |
|---|---|---|---|
| 5,259,063 A * | 11/1993 | Salazar | 706/4 |
| 2001/0051898 A1* | 12/2001 | Nishikiori et al. | 705/26 |
| 2005/0039206 A1* | 2/2005 | Opdycke | 725/35 |
| 2007/0027763 A1* | 2/2007 | Yen et al. | 705/14 |
| 2007/0282898 A1* | 12/2007 | Stark et al. | 707/103 R |
| 2008/0103904 A1* | 5/2008 | Julien et al. | 705/14 |
| 2008/0183794 A1* | 7/2008 | Georgis et al. | 709/201 |
| 2009/0106082 A1* | 4/2009 | Senti et al. | 705/10 |
| 2009/0201812 A1* | 8/2009 | Dettori et al. | 370/235 |
| 2010/0106803 A1* | 4/2010 | Strand | 709/219 |
| 2010/0107201 A1 | 4/2010 | Hannum et al. | |
| 2010/0118200 A1* | 5/2010 | Gelman et al. | 348/578 |
| 2010/0131333 A1* | 5/2010 | Ball et al. | 705/10 |
| 2010/0228632 A1 | 9/2010 | Rodriguez | |
| 2011/0004517 A1 | 1/2011 | Soto et al. | |
| 2011/0016483 A1 | 1/2011 | Opdycke | |
| 2011/0055006 A1* | 3/2011 | Hickman | 705/14.48 |

* cited by examiner

*Primary Examiner* — Imad Hussain
(74) *Attorney, Agent, or Firm* — Scot A. Reader (57) ABSTRACT

Globally assembled, locally interpreted conditional digital signage playlists allow a global administrator with knowledge of content provider intentions but without knowledge of local data collection methods or local customs at digital signage deployments to assemble a conditional playlist on a global basis and be ensured that content items from the playlist will be displayed at all deployments in a manner conformant with content provider intentions, local data collection methods and local customs.

20 Claims, 6 Drawing Sheets

GLOBALLY ASSEMBLED, LOCALLY INTERPRETED CONDITIONAL DIGITAL SIGNAGE PLAYLISTS

BACKGROUND OF THE INVENTION

The present invention relates to digital signage systems, and more particularly, selecting content for display on digital signs in a manner that comports with content provider intentions, local capabilities and local customs.

Traditionally, digital signage deployments that display content items from playlists have displayed the content items sequentially, in a loop.

More recently, conditional playlists for digital signage deployments have emerged. These deployments display content items based on conformance of the content items with measurable selection conditions, such as the location of the digital sign (e.g., for a mobile billboard), the time of day, the day of week or the temperature. In these deployments, a measuring device, such as a global positioning system (GPS) receiver or thermometer, deployed with the digital sign takes measurements that are compared with measurable selection conditions for various content items to determine which content item is displayed. A weakness of these deployments, however, is that their configuration requires an administrator to have knowledge not only of the content provider's intentions but also the measuring devices and local customs at the deployment site. For example, if an ice cream company wants to have its advertisement displayed only during hot weather, the playlist administrator must know not only this fact but also that a thermometer is deployed at the deployment site and a temperature level that would be considered "hot" according to local custom.

SUMMARY OF THE INVENTION

The present invention provides globally assembled, locally interpreted conditional digital signage playlists. Operatively, a global playlist assembler assembles a global conditional playlist that associates an abstract selection condition with each of multiple content items. Abstract selection conditions are attributes, such as "hot" or "cold", whose meaning varies with cultural and societal norms and are not measurable without local context. The global playlist assembler dispatches the global conditional playlist to one or more digital signage deployments. Each digital signage deployment, applying local context data, resolves the global conditional playlist to a local conditional playlist that associates a measurable selection condition with each of the multiple content items. Each digital signage deployment then collects local observational data and selects a content item from its local conditional playlist based on conformance of the local observational data with the measurable selection conditions. Finally, each digital signage deployment displays the selected content item. Advantageously, the invention allows a global administrator with knowledge of content provider intentions but without knowledge of local data collection methods or local customs at digital signage deployments to assemble a conditional playlist on a global basis and be ensured that content items from the playlist will be displayed at all deployment sites in a manner conformant with content provider intentions, local data collection methods and local customs.

In one aspect of the invention, a method for displaying content items from a conditional playlist comprises the steps of receiving at a digital signage deployment a global conditional playlist having multiple content items and an abstract selection condition associated with each of multiple content items; resolving by the deployment, using local context data, the global conditional playlist to a local conditional playlist having the multiple content items and a measurable selection condition associated with each of the multiple content items; collecting by the deployment local observational data; selecting by the deployment a selected content item from the local conditional playlist based on conformance of the local observational data with the measurable selection condition associated with the selected content item; and displaying by the deployment the selected content item.

In some embodiments, the resolving step further comprises resolving by the deployment, using the local context data, the global conditional playlist to a local conditional playlist having a data collection service associated with each of the multiple content items.

In some embodiments, the acquiring step further comprises collecting by the deployment the local observational data using the data collection service associated with the selected content item.

In some embodiments, the data collection service associated with the selected content item performs environmental sensing.

In some embodiments, the data collection service associated with the selected content item performs video monitoring.

In some embodiments, the data collection service associated with the selected content item performs audio monitoring.

In some embodiments, the method further comprises the step of selecting by the deployment a subset of content items from the local conditional playlist based on conformance of the local observational data with the measurable selection conditions associated with the selected subset.

In some embodiments, the method further comprises the step of prioritizing by the deployment the content items within the selected subset.

In some embodiments, the step of selecting by the deployment a selected content item comprises selecting a highest priority content item within the selected subset.

In some embodiments, the method further comprises the step of transmitting by the deployment a list of locally supported abstract selection conditions.

In some embodiments, the selected content item is an advertisement.

In some embodiments, the abstract selection condition is selected from the group consisting of hot, warm and cold.

In some embodiments, the abstract selection condition is selected from the group consisting of humid and dry.

In some embodiments, the abstract selection condition is selected from the group consisting of sunny and overcast.

In some embodiments, the abstract selection condition is selected from the group consisting of light and dark.

In some embodiments, the abstract selection condition is selected from the group consisting of noisy and quiet.

In some embodiments, the abstract selection condition is selected from the group consisting of busy and not busy.

In another aspect of the invention, a digital signage deployment comprises a local media player configured to receive a global conditional playlist having multiple content items and an abstract selection condition associated with each of multiple content items, resolve, using local context data, the global conditional playlist to a local conditional playlist having the multiple content items and a measurable selection condition associated with each of the multiple content items and select a selected content item from the local conditional playlist based on conformance of local observational data with the measurable selection condition associated with the selected content item; a data collection service configured to collect the local observational data and transmit the local observational data to the local media player; and a digital sign configured to receive the selected content item from the local media player and display the selected content item.

In some embodiments, the data collection service is associated with the selected content item in the local conditional playlist.

In some embodiments, the local media player is configured to select a subset of content items from the local conditional playlist based on conformance of the local observational data with the measurable selection conditions associated with the selected subset and prioritize the content items within the selected subset, wherein the selected content item is a highest priority content item within the selected subset.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
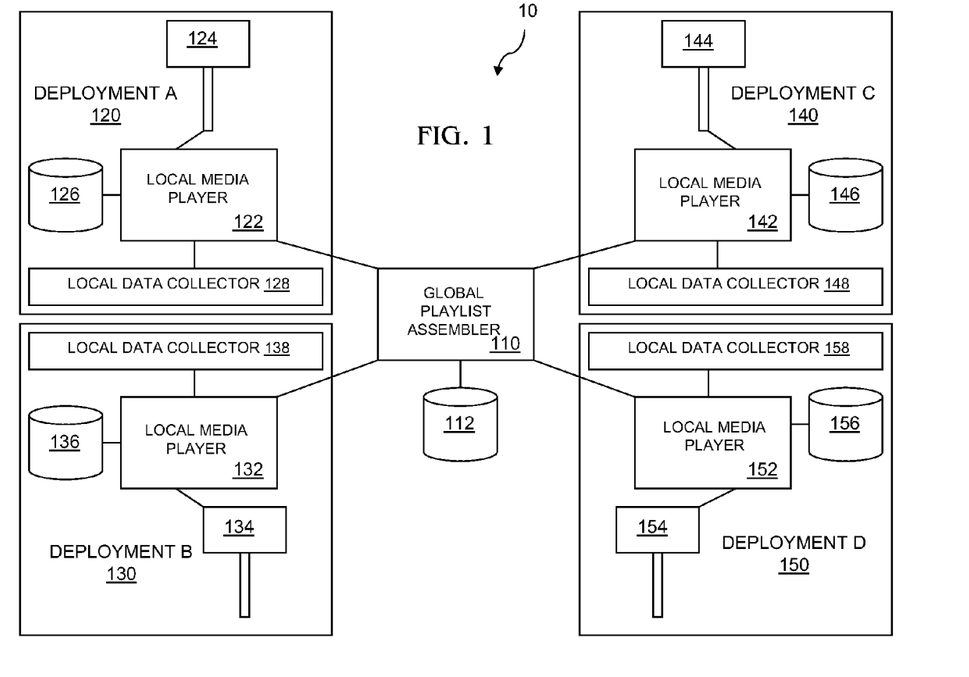
FIG. 1 shows a digital signage network in some embodiments of the invention.

FIG. 1 shows a digital signage network 10 in some embodiments of the invention. Network 10 includes a global playlist assembler 110 communicatively coupled with local media players 122, 132, 142, 152 at respective digital signage deployments 120, 130, 140, 150. Assembler 110 manages a global playlist assembler database 112. Deployments 120, 130, 140, 150 reside in different locales, such as different cities, counties, states or countries and/or different venues. Deployments 120, 130, 140, 150 have respective local media players 122, 132, 142, 152 that operate respective digital signs 124, 134, 144, 154, manage respective local databases 126, 136, 146, 156, and invoke data collection services of respective local data collectors 128, 138, 148, 158. Global playlist assembler 110 and local media players 122, 132, 142, 152 are computing devices having processors that execute software instructions to perform their respective functions.

Digital signs 124, 134, 144, 154 are video displays, such as liquid crystal displays (LCD), light emitting diode (LED) displays, plasma screens or projection screens that show content items. Content items displayed on digital signs 124, 134, 144, 154 may include, without limitation, public service content (e.g., news, weather, traffic advisories), entertainment content (e.g., TV programs, music videos) and advertising content (e.g., commercials, logos, slogans). Moreover, content items may be rendered in various media formats supported by digital signs 124, 134, 144, 154, such as full motion video, screen crawler, still image and still text. Content items may also be displayed in a manner that is interactive and/or transactional.

Figure 2:
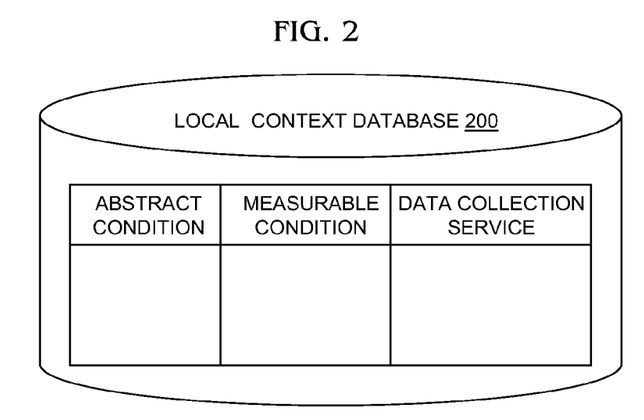
FIG. 2 shows a local context database in some embodiments of the invention.

Local databases 126, 136, 146, 156 each have a local context database and a local playlist database. FIG. 2 shows a representative local context database 200 in some embodiments of the invention. Local context database 200 associates each abstract selection condition supported by the deployment where local context database 200 resides with a measurable selection condition and a data collection service.

Abstract selection conditions are attributes whose meaning varies with cultural and societal norms and are not measurable without local context. For example, temperature-related abstract selection conditions may include "hot", "warm" and "cold"; humidity-related abstract selection conditions may include "humid" and "dry"; cloud cover-related abstract selection conditions may include "sunny" and "overcast"; daylight-related abstract selection conditions may include "light" and "dark"; noise-related abstract selection conditions may include "noisy" and "quiet"; traffic-related abstract selection conditions may include "busy" and "not busy". Of course, other abstract selection conditions are possible, such as "tall", "short", "indoor activity", "outdoor activity", "urban", "suburban" and "rural". Moreover, abstract selection conditions may be event-related attributes that vary across cultures, societies and locales, such as "commute time", "meal time", "start of school year", "end of school year", "business day" or "day of religious observance".

Measurable selection conditions are attributes that are measurable. By way of example, a temperature-related measurable selection condition may be 90 degrees Fahrenheit (90° F.) whereas a noise-related measurable selection condition may be 50 decibels (50 dB).

Data collection services include monitoring devices and analytical tools on local data collectors 128, 138, 148, 158 for collecting local observational data. Local data collectors 128, 138, 148, 158 each support one or more data collection services and these services may differ across collectors 128, 138, 148, 158. Local observational data collected by a data collection service may include, without limitation, temperature, humidity, cloud cover, daylight, noise or traffic data. A data collection service may directly acquire the local observational data (e.g., a temperature reading taken by a thermometer) or acquire the local observational data from another source (e.g., a server that receives a local weather feed). Moreover, a data collection service may invoke analytical software, local time data and/or statistical data to compute local observational data from raw data. For example, a data collection service may include a video camera that captures a raw video feed of a highway or walkway and invokes spatial analysis software to estimate car or foot traffic from the raw video feed. As another example, a data collection service may include a light meter that measures light intensity and combines light intensity data with the time of day to estimate the amount of cloud cover.

Associations between abstract selection conditions and measurable selection conditions are configured in local context database 200 by a local administrator of the deployment where local context database 200 resides based on knowledge or suppositions about local cultural and societal norms. For example, if local norms indicate that people perceive it to be hot when the temperature reaches 90° F., the local administrator may configure in local context database 200 an association between the abstract selection condition "hot" and the measurable selection condition ">90° F.". Similarly, if local norms suggest that people perceive it to be noisy when the noise level reaches 50 dB, the local administrator may configure in local context database 200 an association between the abstract selection condition "noisy" and the measurable selection condition ">50 dB".

Associations between abstract selection conditions and data collection services are configured in local context database 200 by a local administrator of the deployment where local context database 200 resides based on knowledge of local capabilities (i.e., knowledge of which data collections services are locally deployed and are working).

Figure 3:
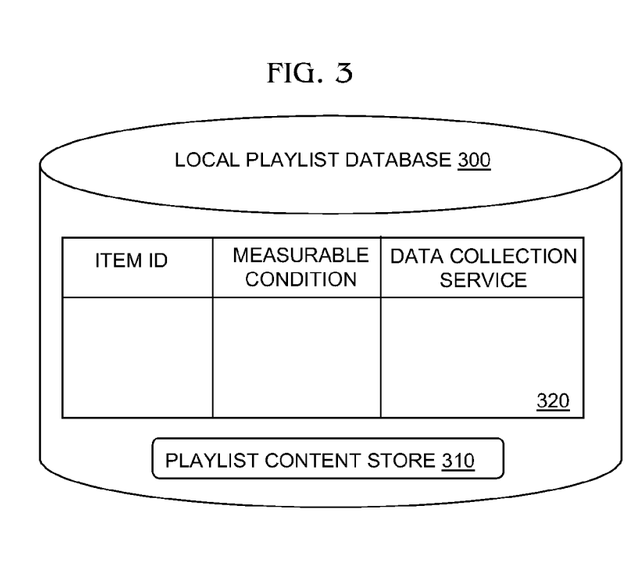
FIG. 3 shows a local playlist database in some embodiments of the invention.

FIG. 3 shows a representative local playlist database 300 in some embodiments of the invention. Local playlist database 300 has a local playlist content store 310 that stores a media file for each content item in a playlist package dispatched by global playlist assembler 110 to the deployment where local playlist database 300 resides. Each media files is stored in association with a unique content item identifier from the playlist package. Local playlist database 300 also has local playlist associated data 320 that stores the content item identifier for each content item in association with a measurable selection condition and a data collection service. In this regard, local media players 122, 132, 142, 152, upon receiving from global playlist assembler 110 a global conditional playlist having multiple content items and an abstract selection condition associated with each of multiple content items, resolves, using local context data from local context database 200, the abstract selection condition associated with each of the multiple content items to a measurable selection condition and a data collection service to produce a local conditional playlist having the multiple content items and a measurable selection condition and data collection service associated with each of the multiple content items, stores the local conditional playlist media files in local playlist content store 310 and stores the local playlist content item identifiers and associated measurable selection conditions and data collection services in local playlist associated data 320.

Figure 4:
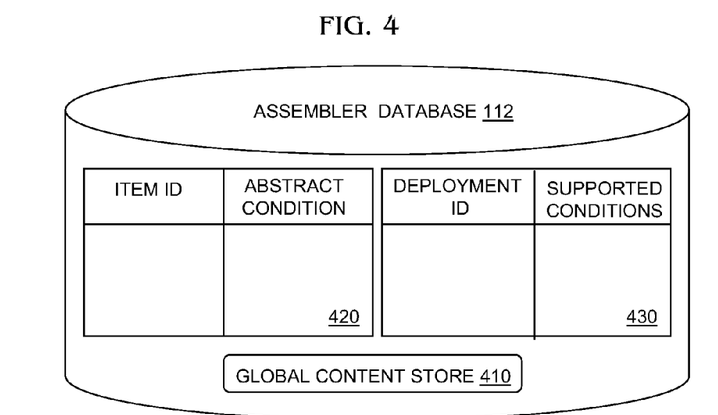
FIG. 4 shows a global playlist assembler database in some embodiments of the invention.

FIG. 4 shows global playlist assembler database 112 in some embodiments of the invention. Assembler database 112 has a global content store 410 that stores a media file for each content item available for inclusion in a global conditional playlist in association with a unique content item identifier. Assembler database 112 also has global content associated data 220 that stores the content item identifiers in association with abstract selection conditions. Assembler database 112 further has deployment capability data 230 that stores supported abstract selection conditions for each of deployments 120, 130, 140, 150 in association with a unique deployment identifier. In this regard, deployments 120, 130, 140, 150 may support a subset of abstract selection conditions due to limited data collection services on their respective local data collectors 128, 138, 148, 158 or cultural or societal impediments. For example, if a working light meter is not among the measuring instruments at one of deployments 120, 130, 140, 150, that deployment will generally not support daylight-related abstract selection conditions. Local media players 122, 132, 142, 152 transmit to global playlist assembler 110 capabilities packages for their respective deployments 120, 130, 140, 150 in response to which global playlist assembler 110 populates or updates deployment capability data 230. In some embodiments, capabilities packages for deployments 120, 130, 140, 150 are received in response to queries transmitted by global playlist assembler 110 to local media players 122, 132, 142, 152. In other embodiments, capabilities packages are transmitted periodically or in response to changes in capabilities of deployments 120, 130, 140, 150.

Figure 5:
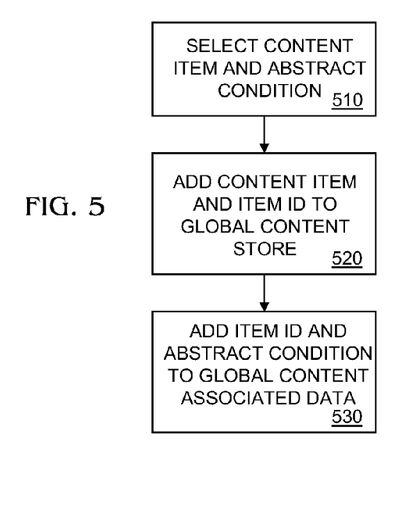
FIG. 5 shows a method for adding a content item to a global content store in some embodiments of the invention.

FIG. 5 shows a method for adding a content item to global content store 410 in some embodiments of the invention. This method is performed by global playlist assembler 110 by receiving inputs from a global administrator and interfacing with global content store 410 and global content associated data 420. The global administrator selects a content item for adding to global content store 410 and associates the content item with an abstract selection condition (510). The abstract selection condition may be selected to conform with the intention of the content provider. For example, if the content item is a coffee advertisement that the coffee company wishes to have displayed only during cold weather, the global administrator may select "cold" as the abstract selection condition. Next, global playlist assembler 110 stores the content item media file in global content store 410 in association with a unique content item identifier (520). Finally, global playlist assembler 110 stores the abstract selection condition in global content associated data 420 in association with the unique content item identifier (530).

Figure 6:
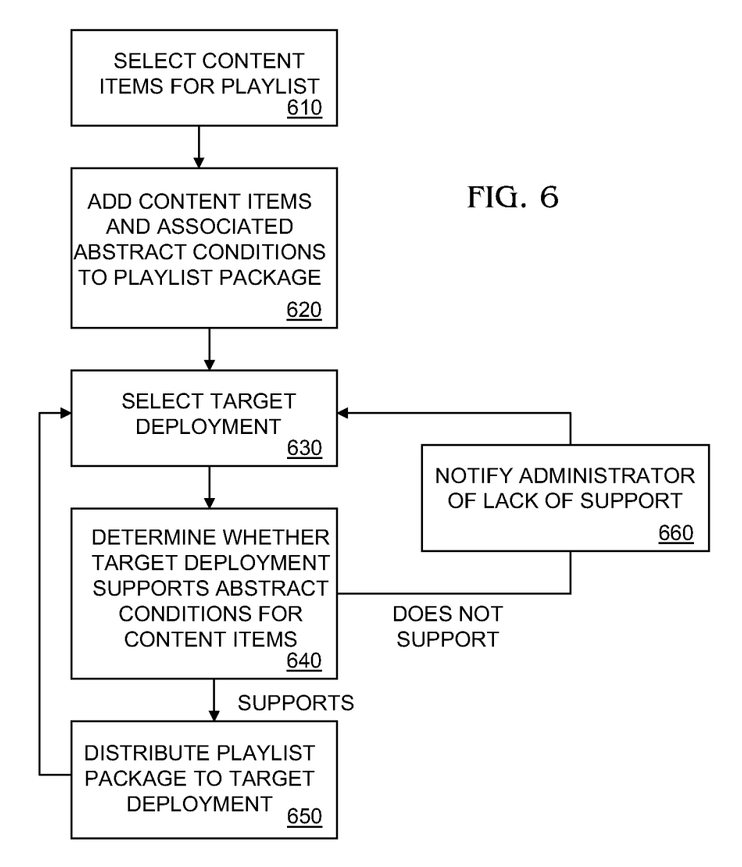
FIG. 6 shows a method for assembling and distributing a global conditional playlist in some embodiments of the invention.

FIG. 6 shows a method for assembling and distributing a global conditional playlist in some embodiments of the invention. This method is performed by global playlist assembler 110 by receiving inputs from a global administrator and interfacing with global content store 410, global content associated data 420 and deployment capability data 430. At the outset, the global administrator selects content items for adding to the global conditional playlist (610). Global playlist assembler 110 uses the content item identifiers associated with the selected content items to retrieve the media files and the abstract selection conditions for the selected content items from global content store 410 and global content associated data 420, respectively, and adds the media files and associated abstract selection conditions to a playlist package (620). In some embodiments, the playlist package includes the media files, a manifest associating the media files with content item identifiers and a metadata file associating the abstract selection conditions with the content item identifiers. Next, the global administrator selects a target deployment for the global conditional playlist (630), at which point global playlist assembler 110 determines whether the target deployment supports the abstract selection conditions associated with the content items in the global conditional playlist (640). More particularly, global playlist assembler 110 uses the deployment identifier associated with the selected target deployment to retrieve from deployment capability data 230 abstract selection conditions supported by the target deployment and compares the supported abstract selection conditions with those associated with the content items in the global conditional playlist. If the target deployment supports the abstract selection conditions associated with all content items in the global conditional playlist, global playlist assembler 110 dispatches the playlist package to the target deployment (650), whereupon the next target deployment is selected (630). However, if the target deployment does not support the abstract selection conditions associated with all content items in the global conditional playlist, the playlist package is not dispatched to the target deployment and the global administrator is notified of the lack of support (660), whereupon the next target deployment is selected (630).

Figure 7:
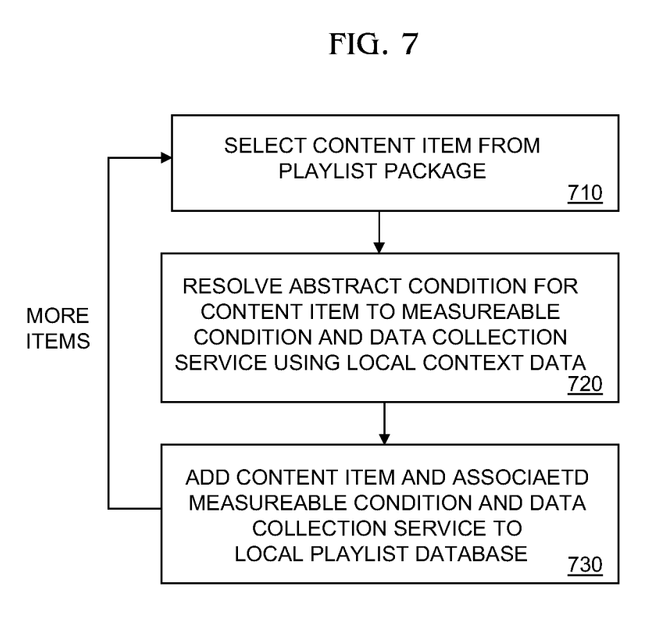
FIG. 7 shows a method for resolving a global conditional playlist to a local conditional playlist in some embodiments of the invention.

FIG. 7 shows a method for resolving a global conditional playlist to a local conditional playlist in some embodiments of the invention. This method is performed by local media players 122, 132, 142, 152 in conjunction with their respective local databases 126, 136, 146, 156 upon receiving a playlist package containing a global conditional playlist. Initially, the local media player selects a content item from the playlist package (710). Next, the local media player resolves the abstract selection condition for the content item to a measurable selection condition and a data collection service by reference to the local context database at the deployment where the local media player resides (720). More particularly, the local media player uses the abstract selection condition associated with the selected content item to retrieve from its local context database a measurable selection condition and data collection service associated with the abstract selection condition. Local media player then adds the media file for the selected content item in association with the content item identifier to its local playlist database, and adds the content item identifier for the selected content item in association with the measurable selection condition and data collection service to its local playlist database (730). The local media player repeats this process for all other content items in the received playlist package. At that point, the local playlist database has stored a local conditional playlist corresponding to the entire global conditional playlist contained in the playlist package.

Figure 8:
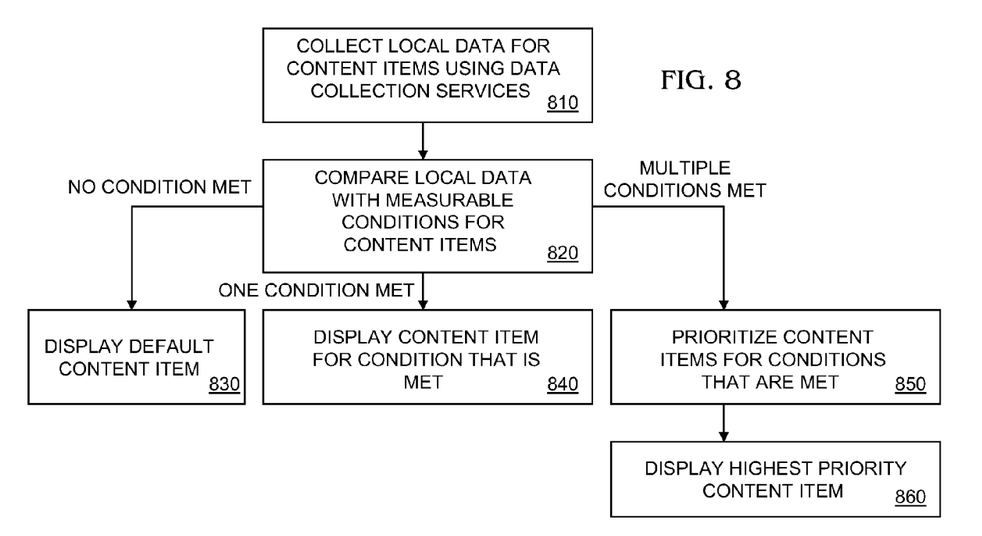
FIG. 8 shows a method for selecting and displaying a content item from a local conditional playlist in some embodiments of the invention.

FIG. 8 shows a method for selecting and displaying a content item from a local conditional playlist in some embodiments of the invention. This method is performed by local media players 122, 132, 142, 152 and local data collectors 128, 138, 148, 158 in conjunction with their respective local databases 126, 136, 146, 156. First, the local media player invokes the data collection service associated with each content item in the local conditional playlist to collect local observational data relating to the measurable selection condition for the content item (810). More particularly, the local media player retrieves from its local playlist database the measurable selection condition and data collection service associated with each content item. The local media player then invokes the data collection service to collect local observational data relating to the measurable selection condition. Next, the local media player compares for conformance the local observational data collected for each content item with the measurable selection condition for the content item (820). If none of the measurable selection conditions is met, the local media player transmits a default content item to its digital sign and the default content item is displayed on the digital sign (830). In this regard, one of the content items in the playlist package received from the global playlist assembler 110 may be designated as the default content item. Alternatively, the local media player may designate the content item that has been most or least recently, or most or least frequently, displayed as the default content item. If exactly one of the measurable selection conditions is met, the local media player transmits the content item associated with the satisfied measurable selection condition to the digital sign and that content item is displayed on the digital sign (840). Finally, if more than one of the measurable selection conditions is met, the local media player prioritizes the content items associated with satisfied measurable selection conditions (850) and transmits the highest priority content item to the digital sign, whereupon that content item is displayed on the digital sign (860).

Taking a concrete example, a first content item in a local conditional playlist may be an ice cream advertisement associated with a measurable selection condition of ">90° F." and a second content item in the playlist may be a coffee advertisement associated with a measurable condition of "<60° F.". Both advertisements may be associated with a temperature data collection service (e.g., thermometer). The local media player invokes the temperature data collection service to collect temperature data and compares for conformance the temperature data with the ">90° F." selection condition for the ice cream advertisement and the "<60° F." selection condition for the coffee advertisement. If the temperature data indicates that the temperature is above 90° F., the ice cream advertisement is displayed. If the temperature data indicates that the temperature is below 60° F., the coffee advertisement is displayed. If the temperature data indicates that the temperature is between 60° F. and 90° F., a default content item is displayed.

Where multiple measurable selection conditions are met, the local media player prioritizes content items associated with these measurable selection conditions based on various criteria, such as the quality of the match, the time since the content item was last displayed or the frequency with which the content item has been displayed. For example, a baseline match quality score may be assigned to a content item based on the level of conformance of the local observational data with the measurable selection condition and that baseline score may be increased in proportion to the elapsed time since the content item was last displayed. Moreover, some or all content items may include multiple measurable selection conditions. Where one content item includes multiple satisfied measurable selection conditions and another content item includes a single satisfied measurable selection condition, the content item that includes multiple measurable selection conditions may be deemed to be a higher quality match and given priority.

Moreover, in some embodiments, content items may be associated with abstract selection conditions that address play frequency, such as "play often" or "play sparingly". In these embodiments, the local media player resolves the abstract selection conditions to measurable selection conditions that comport with local cultural and societal norms regarding play frequency and uses these measurable selection conditions as part of the content selection calculus.

It will be appreciated by those of ordinary skill in the art that the invention can be embodied in other specific forms without departing from the spirit or essential character hereof. Purely by way of example, in some embodiments the content items in the playlist may be audio content items outputted on speakers rather than video content items outputted on digital signs. The present description is thus considered in all respects to be illustrative and not restrictive. The scope of the invention is indicated by the appended claims, and all changes that come with in the meaning and range of equivalents thereof are intended to be embraced therein.

What is claimed is:

1. A method for displaying content items from a conditional playlist, comprising the steps of:
    receiving at a digital signage deployment a global conditional playlist having multiple content items and an abstract observable condition associated with each of multiple content items;
    resolving by the deployment, using local context data, the global conditional playlist to a local conditional playlist having the multiple content items and a measurable observable condition associated with each of the multiple content items, wherein each of the abstract observable conditions is a qualitative condition whose quantitative meaning varies with local norms, wherein each of the measurable observable conditions is a quantitative condition defining one of the abstract observable conditions consistent with local norms at a location of the deployment, and wherein the local context data links ones of the abstract observable conditions with ones of the measurable observable conditions;
    collecting by the deployment local observational data;

selecting by the deployment a selected content item from the local conditional playlist based on conformance of the local observational data with the measurable observable condition associated with the selected content item; and displaying by the deployment the selected content item.

2. The method of claim 1, wherein the local conditional playlist further has a data collection service associated with each of the multiple content items.

3. The method of claim 2, wherein the acquiring step further comprises collecting by the deployment the local observational data using the data collection service associated with the selected content item.

4. The method of claim 3, wherein the data collection service associated with the selected content item performs environmental sensing.

5. The method of claim 3, wherein the data collection service associated with the selected content item performs video monitoring.

6. The method of claim 3, wherein the data collection service associated with the selected content item performs audio monitoring.

7. The method of claim 1, further comprising the step of selecting by the deployment a subset of content items from the local conditional playlist based on conformance of the local observational data with the measurable observable conditions associated with the selected subset.

8. The method of claim 7, further comprising the step of prioritizing by the deployment the content items within the selected subset.

9. The method of claim 8, wherein the step of selecting by the deployment a selected content item comprises selecting a highest priority content item within the selected subset.

10. The method of claim 1, wherein the method further comprises the step of transmitting by the deployment a list of locally supported abstract observable conditions.

11. The method of claim 1, wherein the selected content item is an advertisement.

12. The method of claim 1, wherein the abstract observable condition is selected from the group consisting of hot, warm and cold.

13. The method of claim 1, wherein the abstract observable condition is selected from the group consisting of humid and dry.

14. The method of claim 1, wherein the abstract observable condition is selected from the group consisting, of sunny and overcast.

15. The method of claim 1, wherein the abstract observable condition is selected from the group consisting of light and dark.

16. The method of claim 1, wherein the abstract observable condition is selected from the group consisting of noisy and quiet.

17. The method of claim 1, wherein the abstract observable condition is selected from the group consisting of busy and not busy.

18. A digital signage deployment, comprising:

a local media player configured to receive a global conditional playlist having multiple content items and an abstract observable condition associated with each of multiple content items, resolve, using local context data, the global conditional playlist to a local conditional playlist having the multiple content items and a measurable observable condition associated with each of the multiple content items, wherein each of the abstract observable conditions is a qualitative condition whose quantitative meaning varies with local norms, wherein each of the measurable observable conditions is a quantitative condition defining one of the abstract observable conditions consistent with local norms at a location of the deployment, and wherein the local context data links ones of the abstract observable conditions with ones of the measurable observable conditions, and select a selected content item from the local conditional playlist based on conformance of local observational data with the measurable observable condition associated with the selected content item;

a data collection service configured to collect the local observational data and transmit the local observational data to the local media player; and a digital sign configured to receive the selected content item from the local media player and display the selected content item.

19. The deployment of claim 18, wherein the data collection service is associated with the selected content item in the local conditional playlist.

20. The deployment of claim 18, wherein the local media player is configured to select a subset of content items from the local conditional playlist based on conformance of the local observational data with the measurable observable conditions associated with the selected subset and prioritize the content items within the selected subset, wherein the selected content item is a highest priority content item within the selected subset.

* * * * *